United States Patent [19]

Sawyer et al.

[11] 4,289,572
[45] Sep. 15, 1981

[54] METHOD OF CLOSING SILICON TUBULAR BODIES

[75] Inventors: David H. Sawyer, Lee Township, Midland County; Joseph A. Henige, Chesaning; Alvin W. Rauchholz, Hemlock, all of Mich.

[73] Assignee: Dow Corning Corporation, Midland, Mich.

[21] Appl. No.: 754,481

[22] Filed: Dec. 27, 1976

[51] Int. Cl.³ .................................... C30B 29/00
[52] U.S. Cl. .................. 156/617 SP; 156/DIG. 98
[58] Field of Search .............. 156/DIG. 88, DIG. 64, 156/608, 617 SP; 65/34

[56] References Cited

U.S. PATENT DOCUMENTS

| | | | |
|---|---|---|---|
| 2,962,363 | 11/1960 | Martin | 156/617 SP |
| 3,015,592 | 1/1962 | Leopold | 156/617 SP |
| 3,490,889 | 1/1970 | Goto | 156/DIG. 88 |
| 3,550,251 | 12/1970 | Goto | 65/34 |
| 3,621,213 | 11/1971 | Jen | 156/617 SP |
| 3,650,703 | 3/1972 | La Belle | 156/608 |
| 3,915,662 | 10/1975 | La Belle | 156/617 SP |
| 3,943,324 | 3/1976 | Haggerty | 156/DIG. 88 |
| 3,953,174 | 4/1976 | La Belle | 156/DIG. 88 |

FOREIGN PATENT DOCUMENTS 1025526 of 1958 Fed. Rep. of Germany ... 156/DIG. 88

OTHER PUBLICATIONS

Stepanov, Leningrad Physico-Tech. Insti; Acad. Sci., USSR, 1941, pp. 339-348.

Primary Examiner—Hiram Bernstein
Attorney, Agent, or Firm—Howard W. Hermann; Max J. Kenemore

[57] ABSTRACT

There is described a method of closing ends of silicon tubular bodies in which the tube end to be closed is dipped into melt of silicon maintained at substantially the melting temperature of silicon until the end of the tube is heated to the melting point and then withdrawing the tube from the melt with melt temperature sufficiently low to cause freezing of molten silicon at tube end and at temperature and speed sufficient to cause decreasing diameter of the freezing silicon until the desired diameter reduction or closure is obtained and then breaking contact with the melt. Additionally, surface portions may be machined after withdrawal from the melt to allow connections to be made.

5 Claims, 4 Drawing Figures

METHOD OF CLOSING SILICON TUBULAR BODIES

BACKGROUND OF THE INVENTION

The present invention relates to silicon tubular bodies and more particularly to methods of partially or totally closing the ends of such devices.

The manufacture of silicon tubes is described, for example, in Keller et al. U.S. Pat. No. 3,781,152. Such devices are commonly made by depositing silicon from as phase reduction of chlorosilanes with hydrogen on a heated mandrel such as graphite and have found application as furnace tubes for semiconductor device manufacturing, for example. For some applications it is desirable that such tubes be provided with closed ends. There is also sometimes a need for attachment to other devices such as feed lines, for example, and this is difficult with open end tubes.

U.S. Pat. No. 3,751,539 to Reuschel et al. discloses a method of making a closed end silicon tube by vapor deposition, then welding a silicon wafer across the tube end and then depositing additional silicon. This method, however, requires two separate deposition steps plus removal from the reactor between the two steps to effect the welding. This obviously requires substantial labor as well as energy loss in the multiple handing and heating. Additionally, it has been found that the uneven heating inherent in R.F. welding causes thermal stresses which often result in cracking.

The Czochralski method for growing crystals from a melt by dipping a seed in the melt is well known and used extensively in producing silicon crystals for the semiconductor industry. Examples of the Czochralski process are shown in Sparks et al. U.S. Pat. No. 2,631,356 and Rosi U.S. Pat. No. 2,889,240.

SUMMARY OF THE PRESENT INVENTION

Applicants have discovered that ends of silicon tubular bodies can be closed or reduced in diameter by application of the Czochralski technique to the tube end. In effect the tube takes the place of the seed crystal in the usual Czochralski crystal pulling process.

More specifically, the silicon tube end is dipped into a silicon melt and allowed to melt until a meniscus is visible, showing that melting has occurred and insuring contact between tube and melt. Then the tube is withdrawn as in the Czochralski technique to cause freezing of molten silicon on the tube end. By controlling melt temperature and pulling speed the diameter can be gradually reduced as desired and eventually totally closed, if that is the desired result. The tube then is pulled from the melt.

The process can be carried a step further to provide, for example, end connections for silicon tubular bodies for connection to gas carrying lines, or the like, by machining surface portions to fit as connectors.

The process is relatively simple and provides results with a minimum of labor. It is adaptable to provide total or partial closures of circular or other tubular configurations and allows machining of connector elements as desired. Inasmuch as such machining is possible, connection difficulties are minimized. The result, therefore, is an all-silicon hollow body which was heretofore not attainable.

BRIEF DESCRIPTION OF THE DRAWINGS

The invention and its advantages will become better understood by those skilled in the art from the following detailed description of preferred embodiments when read in conjunction with the accompanying drawings wherein.

DESCRIPTION OF PREFERRED EMBODIMENTS

Figure 1:
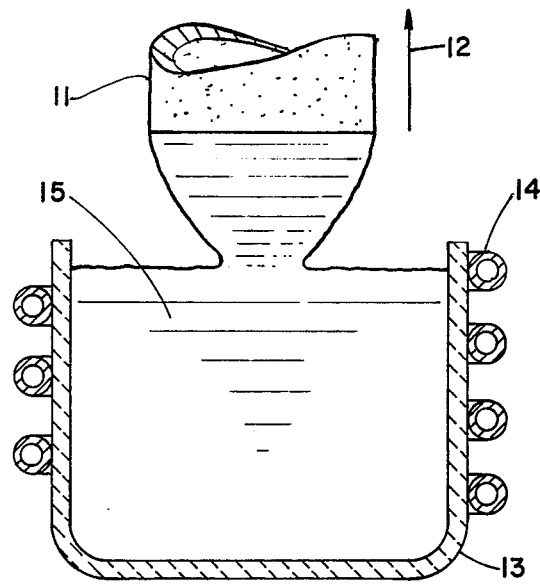
FIG. 1 is a diagrammatic view illustrating the process of the invention.

Referring now to the drawings wherein like reference numerals designate like parts, there is shown a tubular body 11 of silicon being pulled upwardly as shown by the arrow 12 from a conventional Czochralski crucible 13 which is desirably made of quartz. The crucible 13 is heated by conventional means such as electrical resistance or an induction heating coil 14 which surrounds it and is energized by a suitable electrical power source.

The crucible contains a volume of molten silicon 15 having a surface area portion which has a temperature approximating the freezing temperature of silicon as described, for example in the aforementioned Sparks et al. U.S. Pat. No. 2,631,356 and in Rosi U.S. Pat. No. 2,889,240. Desirably, rotation of the melt relative to the rod is maintained for more uniform temperature distribution and also desirably the system is purged with inert gas such as Argon as is conventional in crystal growth.

Figure 2:
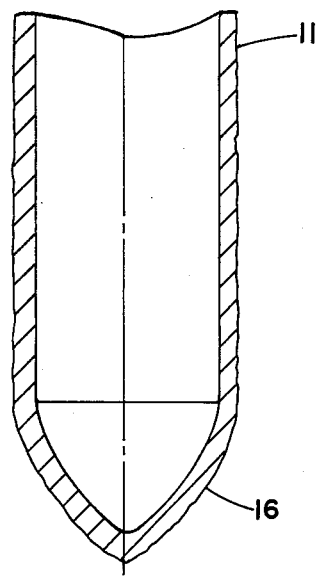
FIG. 2 is a cross-sectional view of a closed end tubular body of silicon made in accordance with the invention.

The end of the tubular body 11 is immersed into the molten silicon 15 with the melt temperature maintained until a meniscus of molten material is visible around the body above remainder of the melt surface, indicating that melting of the end has taken place. Upward pull of the body 11 is then begun with temperature controlled so that solidification (freezing) takes place slightly above the melt surface. Temperature and pull rate are controlled to cause a gradual reduction in diameter of the tube until it is reduced as much as desired or until it is totally closed. The tube then is pulled from the melt. A typical closed end tube 11 having a Czochralski technique formed closure 16 is illustrated in FIG. 2.

Figure 3:
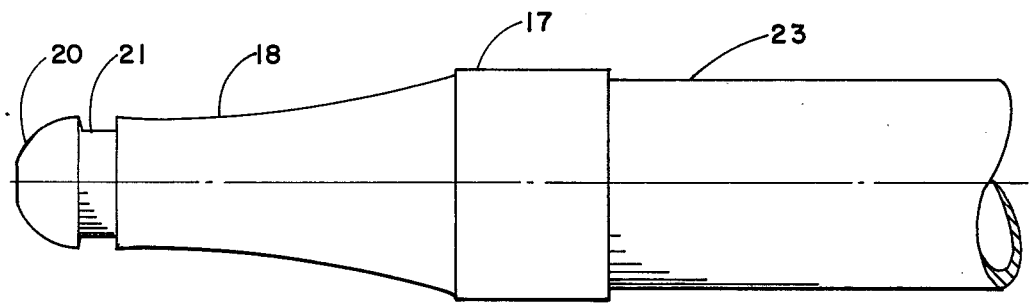
FIG. 3 is an elevational view of a furnace tube having an end fitting made by the present invention.
Figure 4:
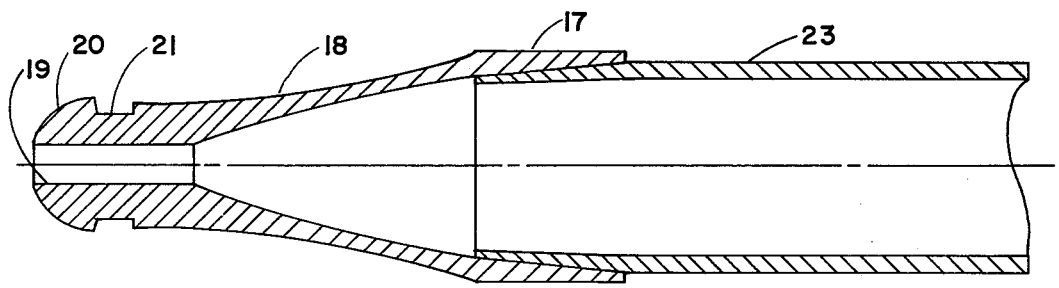
FIG. 4 is a cross-sectional view of the furnace tube of FIG. 3.

Aside from forming a simple closed end tube the technique can be used to form more complicated devices. For example, there is shown in FIGS. 3 and 4 a furnace tube end coupling consisting of a tubular portion 17 which was handled in accordance with the foregoing method to form a generally tapered portion 18 of reduced diameter and a tip portion of relatively constant diameter grown from a melt in the same manner by continued pulling at constant speed and temperature after the desired necking has occurred.

The tip portion is thereafter machined with diamond or silicon carbide tools and/or grinding agents by reaming the internal hole 19 to constant diameter and machining a sphere shaped portion 20 and groove 21 on the external portions thereof for mating with a tubular connector. The inner surface of the tube 11 is tapered to accommodate a tapered end portion 22 of a furnace tube 23. Thus, gas inlet or outlet connections can be from the furnace tube 23 using the device.

In a specific embodiment of the invention a Czochralski crystal grower was used with a resistance heated quartz crucible containing a charge of 540 grams of silicon. A silicon tube having an outside diameter of approximately 38 mm. and wall thickness varying between about 1.9 and 2.5 mm. was mounted in the chuck of the crystal puller and lowered into the molten silicon in an Argon atmosphere while the tube was rotated at 5 rpm and the crucible counter-rotated at 7 rpm. The temperature of the melt was gradually lowered until the tube end could be raised with a visible meniscus without melting off whereby the tube would be allowed to be pulled free of the melt. At this point freezing (growth of material on the tube end) was visually observable and pulling was maintained at a constant rate of about 32 mm. per hour. Within an hour the tube end had been reduced in diameter to about one-half inch and 45 minutes later it was pulled free of the melt and found to be completely closed.

Similarly, a silicon tube having an outside diameter of about 51 mm. was closed. In this case, pulling was started at a rate of about 40 mm. per hour, increased to about 43 mm. per hour after 2 hours and 15 minutes, again increased to about 51 mm. per hour for another 15 minutes, then increased still further to 57 mm. per hour for an additional half hour. The tube was then pulled from the melt and found to be completely closed in a very blunt transistion of the tube hollow but with substantial solid silicon grown after closure.

A thin walled closure was made by pulling a further tube of 51 mm. diameter at a more rapid rate. In this case the pull rate for the first 45 minutes was about 57 mm. per hour. It was then increased to about 76 mm. per hour for 14 minutes, then further increased to about 92 mm. per hour but after about 1 minute separated from the melt. Upon examination, however, the tube was found to be closed by a relatively uniform thin wall.

It is to be understood that the above description is exemplary of the invention but that various modifications of the process and devices described will occur to those skilled in the art and are considered to be within the scope of the present invention as defined in the claims set forth hereinafter.

That which is claimed is:

1. A method for modifying the shape of the end of a silicon tubular body which comprises:
   (a) immersing the end of the tubular body into a silicon melt;
   (b) maintaining the melt at the melting temperature of silicon until a melt meniscus forms on the body above the melt surface, indicating the body has reached its melting temperature;
   (c) withdrawing the tubular body gradually from the melt while controlling the temperature to cause progressive freezing of the melt meniscus to the end of the tubular body as the tubular body is withdrawn;
   (d) adjusting the temperature and withdrawal rate to cause progressive diameter reduction of the frozen portion until the immersed end of the body is reduced to the desired extent; and
   (e) thereafter increasing the withdrawal rate to separate the body from the melt.

2. The method of claim 1 wherein the diameter of the frozen portion of the body is progressively reduced until the body is closed.

3. The method of claim 1 including the additional step of machining the modified end of the tubular body.

4. The method of claim 2 wherein the modified end is machined to fit as a connector.

5. The method of claim 1 wherein relative rotation between the body and the melt is maintained at least during the steps of withdrawing and adjusting.

* * * * *